(12) United States Patent
Liao et al.

(10) Patent No.: US 7,756,541 B2
(45) Date of Patent: Jul. 13, 2010

(54) POC SYSTEM AND METHOD FOR DISTRIBUTING MEDIA DATA IN POC

(75) Inventors: Yien-Chang Liao, Hsinchu County (TW); Fang-Ming Lai, Hsinchu County (TW); Mu-Liang Wang, Hsinchu (TW); Chun-Chieh Wang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 1152 days.

(21) Appl. No.: 11/306,552

(22) Filed: Jan. 2, 2006

(65) Prior Publication Data

US 2007/0124492 A1    May 31, 2007

(30) Foreign Application Priority Data

Nov. 4, 2005   (TW) ............... 94138729 A

(51) Int. Cl.
  *H04B 7/00* (2006.01)
(52) U.S. Cl. .................. 455/518; 455/519; 455/520; 370/327; 370/312
(58) Field of Classification Search ......... 455/518–521; 370/327, 260–261
  See application file for complete search history.

(56) References Cited

U.S. PATENT DOCUMENTS

| 6,882,850 B2 | 4/2005 | McConnell et al. ......... 455/453 |
| 2006/0223563 A1* | 10/2006 | Sung et al. .................. 455/518 |
| 2007/0058573 A1* | 3/2007 | Schwagmann et al. ...... 370/260 |

FOREIGN PATENT DOCUMENTS

EP    0 969 687 A1 *   7/1998

OTHER PUBLICATIONS

"IMS-based push-to-talk over GPRS/UMTS", Kim, P. Balazs, A. van den Brock, E. Kieselinann, G. Bohm, W., Wireless Communications and Networking Conference, 2005 IEEE, Publication Date: Mar. 13-17, 2005 vol. 4, p. 2472-p. 2477.

* cited by examiner

*Primary Examiner*—Nay A Maung
*Assistant Examiner*—Angelica M Perez
(74) *Attorney, Agent, or Firm*—Jianq Chyun IP Office

(57) ABSTRACT

The present invention provides a PoC system (push-to-talk over cellular system) and a method for distributing media data in PoC. The PoC system includes a plurality of clients, a controlling server and a first participating server. In the present invention, since a media receiving port is established in the first participating server which manages at least two clients at the same time, and when a media data is going to be distributed to the clients managed by the first participating server, the controlling server delivers the media data to the media receiving port only. In addition, a multicast addressing technology is further used in the first participating server, therefore, the path of delivering media data is changed and the efficiency of media data delivery during a communication is improved.

10 Claims, 5 Drawing Sheets

POC SYSTEM AND METHOD FOR DISTRIBUTING MEDIA DATA IN POC

CROSS-REFERENCE TO RELATED APPLICATION

This application claims the priority benefit of Taiwan application serial no. 94138729, filed on Nov. 4, 2005. All disclosure of the Taiwan application is incorporated herein by reference.

BACKGROUND OF THE INVENTION

1. Field of Invention

The present invention relates to a push-to-talk over cellular (PoC) service, and particularly to a PoC system and a method for distributing media data in PoC.

2. Description of the Related Art

The push-to-talk (PT) method is derived from the walkie-talkie technology and has been broadly used in cellular and Internet environments today. Open Mobil Alliance (OMA) further established a PoC working team for setting the pertinent standards. Quite distinguished from a walkie-talkie system, however, with a PoC system a user must request all online members to be communicated to establish a communication group and to participate in the group prior to obtaining the PTT services. In addition, during establishing the communication group, a voice data delivering path must be decided, and once the communication group is successfully established only a member is allowed to speak while the other members are listening to the speaker in a communication session.

FIG. 1 is a schematic flowchart for conventionally distributing media data in PoC. Referring to FIG. 1, according to the pertinent standards set by OMA, a PoC system associated with a communication group can include a controlling server 110, a first participating server 120 and a second participating server 130, wherein the two participating servers are distributed in different domains, and different clients (members of the group) 142, 144, 146 and 148, which are connected to the corresponding participating server, respectively. During establishing a communication group, the clients 142, 144, 146 and 148, the participating servers 120 and 130 and the controlling server 110 coordinate the voice support capabilities of both parties through SIP signals (session initiation protocol signals) and further decide the manner and paths for delivering media data. Afterwards, the members of the communication group (different clients) deliver voice data packets to each other via the paths.

From FIG. 1 it is clear that the client B 142, the client C 144 and the client D 146 are stationed at a same domain and managed/served by the first participating server 120. The controlling server 110 is in charge of managing/serving the whole communication group, no matter whether the clients as receivers belong to a same participating server or not. Once the voice data sent from the client A 148 is received via the second participating server 130, the controlling server 110 would send a voice data to every member of the communication group except for the sender client A 148. Therefore, according to such a scheme of distributing media data, the same voice data packet would be sent to the first participating server 120 repeatedly for three times; the first participating server 120 resends the same voice data packet respectively to the client B 142, the client C 144 and the client D 146, i.e. a total of three times. In short, using the conventional scheme to distribute a voice data, it needs to send the same voice data to every client, which results in sending the same voice data packet repeatedly for multiple times and accordingly wasting the Internet resource and bandwidth.

SUMMARY OF THE INVENTION

The present invention provides a method for distributing media data in PoC, wherein the delivering path of media data is changed during a group communication, which avoids the repeated delivery of a media data packet and advances the efficiency of media data delivery during a communication.

The present invention provides a PoC system, which changes the path of delivering media data during a communication within the PoC group, so that the waste of the internet resource and bandwidth is avoided. Furthermore, a multicast technology can be used by the PoC system to further improve the efficiency of media data delivery during a communication.

The present invention provides a PoC system and a method for distributing media data using the PoC system. The PoC system includes a plurality of clients, a controlling server and a first participating server. According to the present invention, to establish a PoC communication group, the controlling server would send out a request for establishing the PoC communication group first, followed by waiting for and receiving responses of accepting the request. If at least two clients among all the clients who join the PoC communication group belonged to the first participating server and accept the management and service thereby, the controlling server would inform the first participating server of establishing a media receiving port in the first participating server. Afterwards, once the controlling server receives the response stating the media receiving port has been established and wishes to deliver the media data to the clients managed by the first participating server, the controlling server would deliver the media data to the media receiving port of the first participating server without delivering the media data to the first participating server repeatedly.

According to the PoC system and the method for distributing media data using the PoC system provided by the embodiment of the present invention, to further advance the efficiency of media data delivery, the above-described first participating server establishes a multicast address and informs the managed clients thereof of the multicast address. After the first participating server receives the responses sent by the clients for participating in the multicast address, when delivering the media data to the clients the first participating server delivers the media data to the multicast address by using the multicast technology The PoC system provided by the embodiment of the present invention can further include a second participating server, which manages and serves the clients who request to initiate the communication group. Hence, as the requesting client is going to establish a communication group, the second participating server receives the request of establishing a PoC communication group sent by the requesting client first, followed by sending a request of establishing a PoC communication group to the controlling server and waiting for and receiving a response of agreeing with the request from the controlling server. Once the second participating server receives a response of agreeing with the request from the controlling server, the second participating server would send a response of agreeing with the request to the above-described requesting client in order to inform the requesting client that the PoC communication group has been successfully established. During a group communication, the second participating server receives a media data sent by the requesting client first, followed by sending the media data to the controlling server.

According to the present invention, since a media receiving port is established in the first participating server which manages a plurality of clients at the same time and when a media data is going to be distributed to the clients managed by the first participating server the controlling server delivers the media data to the media receiving port only, therefore, the path of delivering media data is changed without delivering the media data packet repeatedly. Accordingly, the waste of the internet resource and bandwidth can be eliminated. Furthermore, a multicast technology is used in the first participating server to further advance the efficiency of media data delivery during a communication.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
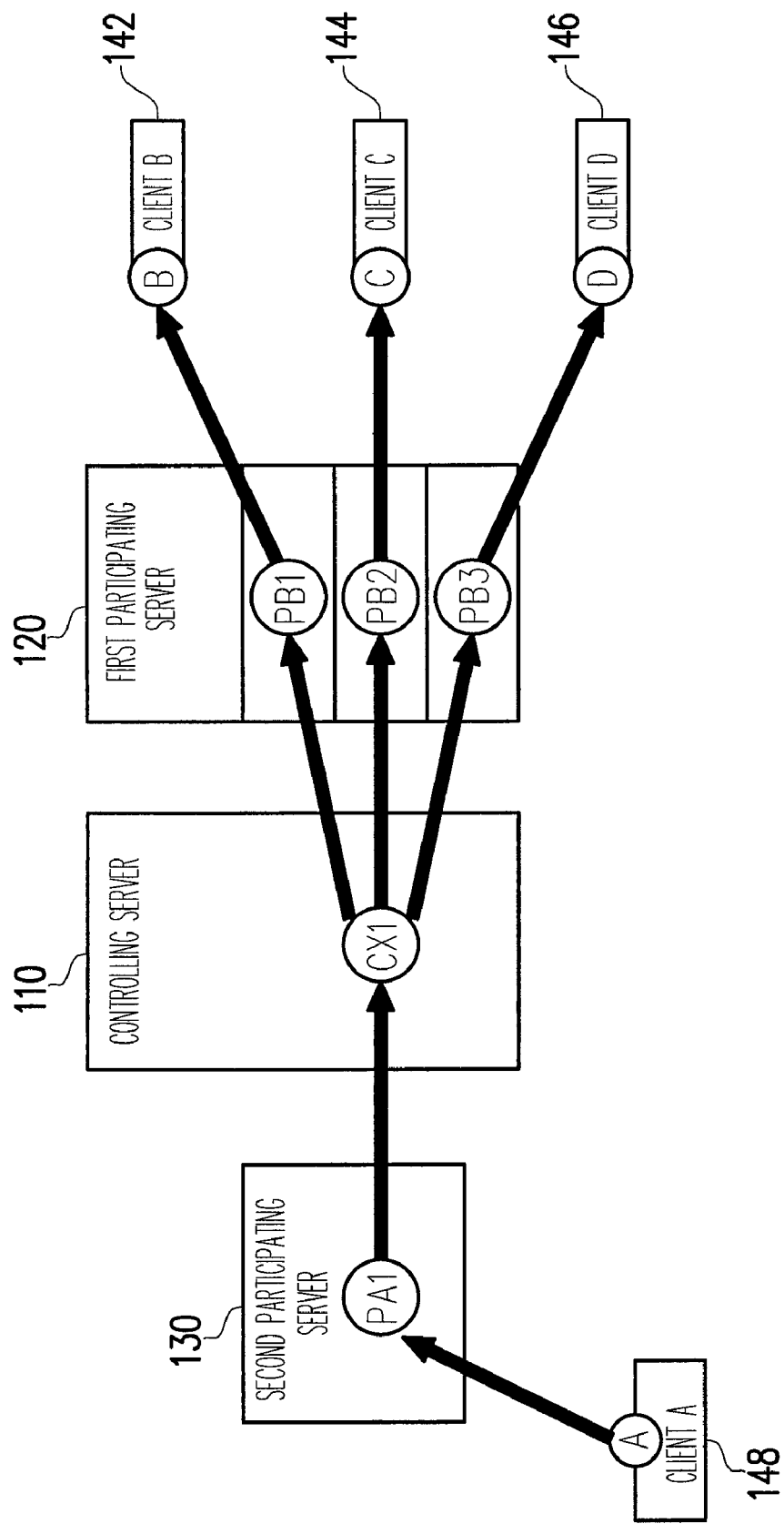
FIG. 1 is a schematic flowchart for conventionally distributing media data in PoC.
Figure 2:
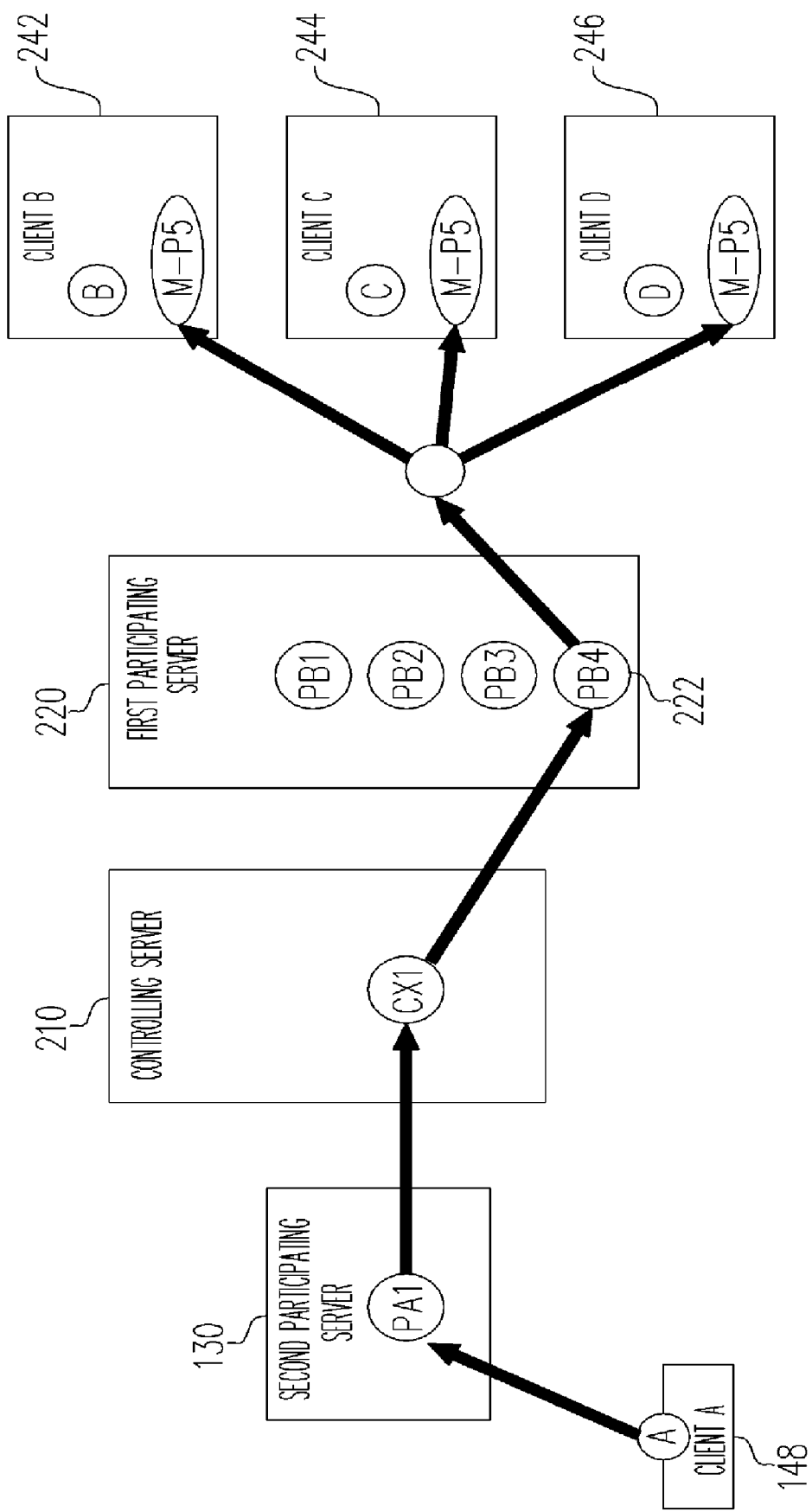
FIG. 2 is a schematic flowchart for distributing media data in PoC according to an embodiment of the present invention.

FIG. 2 is a schematic flowchart for distributing media data in PoC according to an embodiment of the present invention. Referring to FIG. 2, a PoC system provided by the embodiment includes a plurality of clients 242, 244, 246 and 148, a controlling server 210, a first participating server 220 and a second participating server 130. Wherein, the first participating server 220 and the second participating server 130 belong to different domains respectively and are coupled to the controlling server 210 in a manner to meet the specification requirement of a cellular, while the clients 242, 244 and 246 are coupled to the first participating server 220 and the client 148 is coupled to the second participating server 130.

When a requesting client is going to establish a communication group, for example, the client A 148 managed/served by the second participating server 130 will initiate and establish a PoC communication group, the second participating server 130 would receive the request of establishing a PoC communication group sent by the client A 148, first. Then, the second participating server 130 sends a request of establishing a PoC communication group to the controlling server 210. Afterwards, the controlling server 210 would send a plurality of requests of establishing a PoC communication group to all the member clients of the PoC communication group via the participating server. For example, the controlling server 210 would send requests of establishing a PoC communication group to the client B 242, client C 244 and client D 246 via the first participating server 220.

Once the controlling server 210 receives responses of agreeing the request sent by one of or all of the client B 242, client C 244 and client D 246 via the first participating server 220, the controlling server 210 also sends a response of agreeing the request to the second participating server 130. After the second participating server 130 receives the response of agreeing the request from the controlling server 210, the second participating server 130 would send a response of agreeing the request to the client A 148 to notify that the PoC communication group is successfully established and a communication with the members of the PoC communication group can be started.

Note that the controlling server 210 of the present invention would make a judgment on all the clients participating the PoC communication group. If at least two clients among all the clients, who successfully participate the PoC communication group, are managed/served by a same participating server, for example, if at least two clients sending responses of agreeing the request belong to the first participating server 220 for being managed, the controlling server 210 would inform the first participating server 220 of establishing a new media receiving port 222 in the first participating server 220. Thus, the first participating server 220 of the present invention would establish the media receiving port 222 therein as an intermediate transfer stop for the PoC communication group to distribute media. Further, the first participating server 220 sends a response of having established the media receiving port. Once the controlling server 210 receives the response of having established the media receiving port, the path for delivering the media data in the PoC communication group is certainly changed.

During a group communication, if a member of the PoC communication group wants to deliver a media data to the other members, for example, the client A 148 wants to speak, the second participating server 130 would receives a media data sent by the client A 148, first. Then, the second participating server 130 sends the media data to the controlling server 210. Afterwards, although the controlling server 210 wishes to deliver the media data to the three clients, 242, 244 and 246 managed by the first participating server 220, while the controlling server 210 would not deliver the media data to the first participating server 220 repeatedly for three times and, instead, deliver the media data once only, i.e. would deliver the media data to the media receiving port 222 of the first participating server 220. The foregoing media data basically is a voice data. Of course, sometimes a multimedia data, for example, a video data can be included.

In the embodiment, to further advance the efficiency of media data delivery, the above-mentioned first participating server 220 establishes a multicast address and informs the clients 242, 244 and 246 managed thereby of the multicast address. Then, once responses of participating in the multicast address sent by the clients 242, 244 and 246 are received, the first participating server 220 would take advantage of the multicast technology and deliver the media data to the multicast address when the first participating server 220 wants to deliver the media data to the clients 242, 244 and 246.

Figure 3:
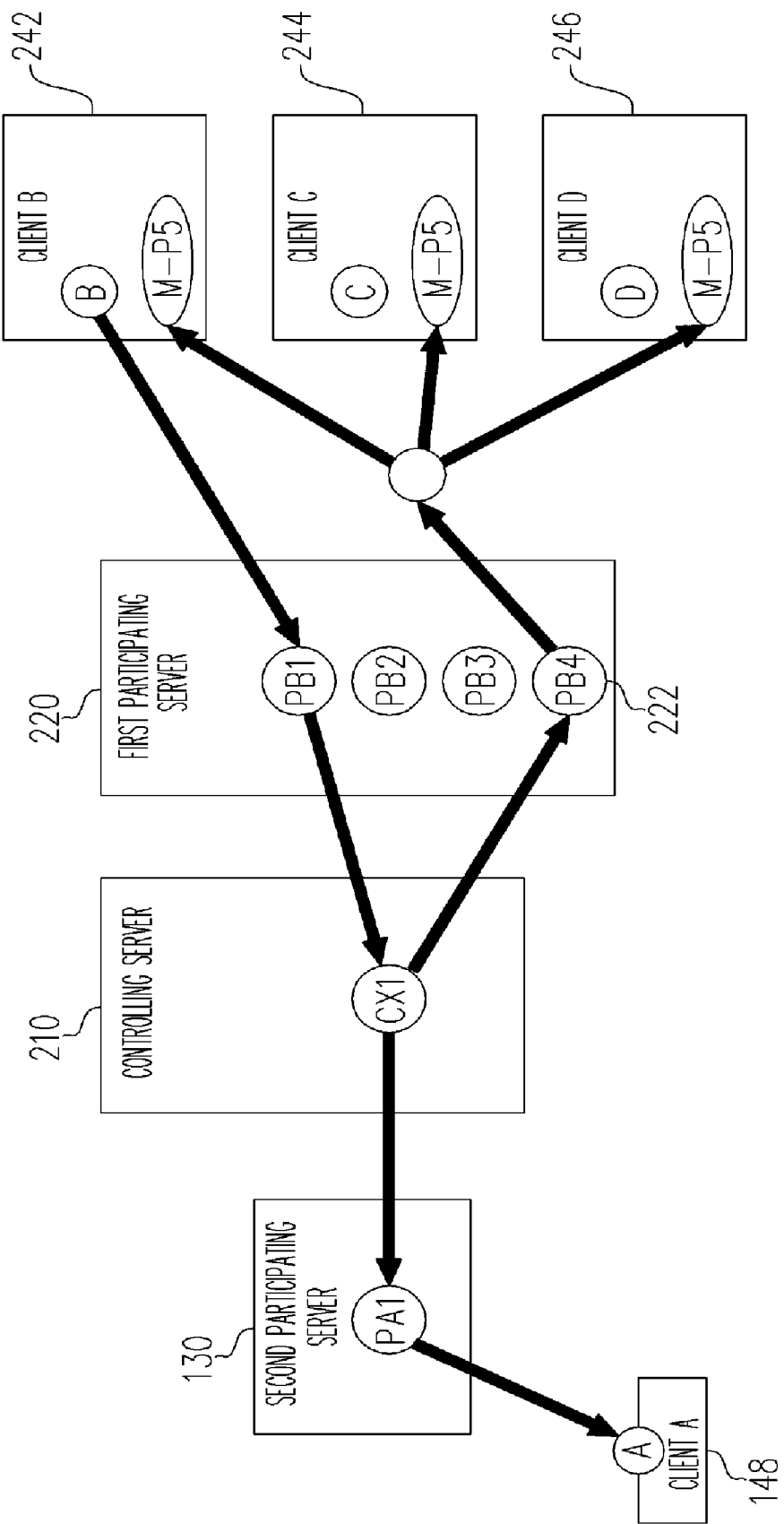
FIG. 3 is a schematic flowchart for distributing media data in PoC according to another embodiment of the present invention.

FIG. 3 is a schematic flowchart for distributing media data in PoC according to another embodiment of the present invention. Referring to FIG. 3, FIG. 3 is similar to FIG. 2 (the same part is omitted for simplicity herein) except that in FIG. 3 the client B 242 managed by the first participating server 220 initiates to speak herein. The first participating server 220 receives a media data sent by the client B 242, first. Then, the first participating server 220 sends the media data to the controlling server 210. Afterwards, the controlling server 210 delivers the media data to the client A 148 via the second participating server 130. Remarkably, the controlling server 210 does not deliver the media data to the first participating server 220 repeatedly for several times, instead, delivers the media data to the media receiving port of the first participating server 220 only.

In the forgoing two embodiments, the second participating server 130 and the client A 148 managed thereby in the PoC communication group is considered as exemplary only. In fact, the present invention allows being without the second participating server 130 and only the first participating server 220 remains in an embodiment, wherein all clients are managed merely by the first participating server, which is still within the scope of the invention.

Figure 4A:
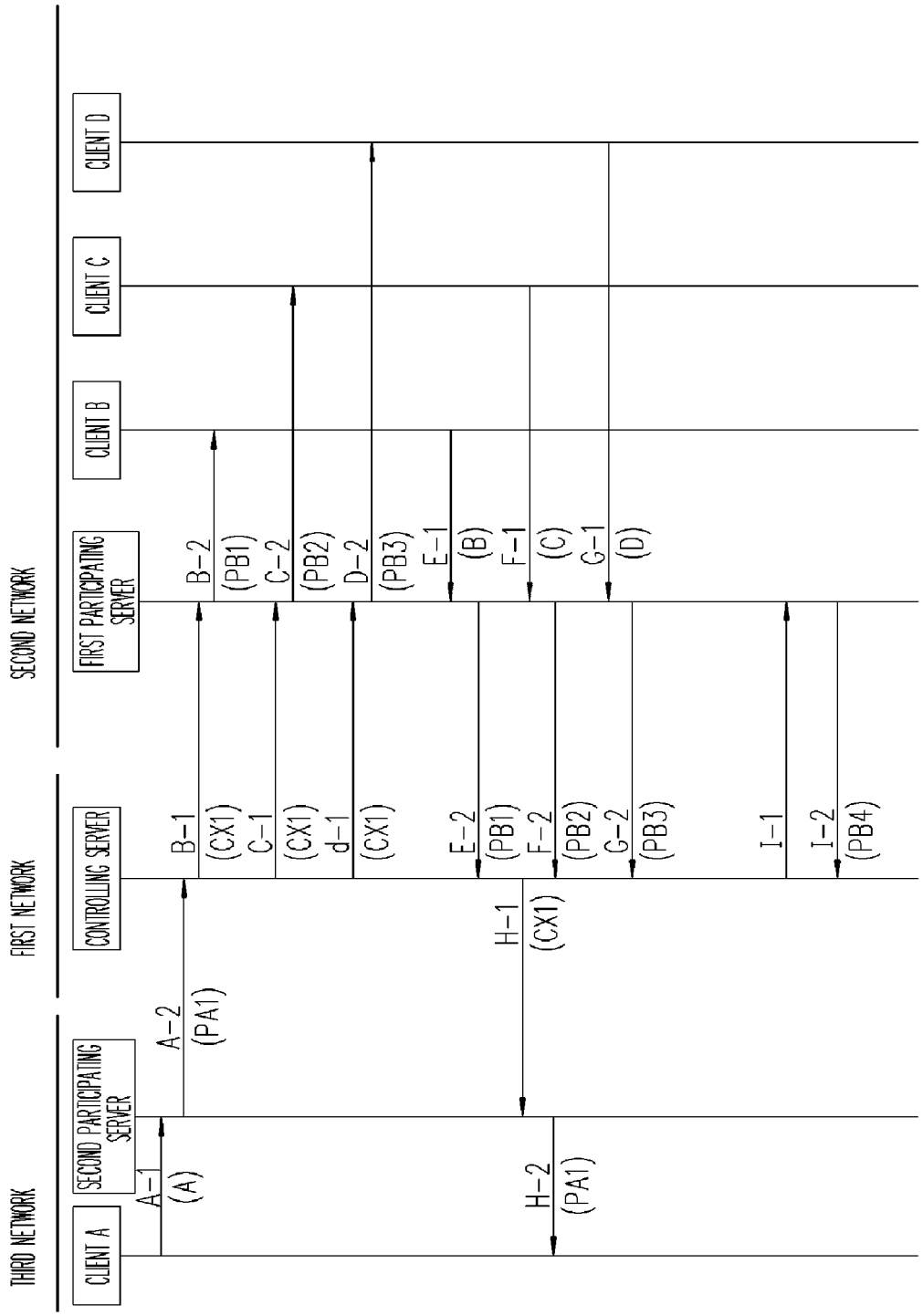
FIGS. 4A and 4B are schematic detailed flowcharts for distributing media data after establishing a PoC communication group according to the embodiment of the present invention.
Figure 4B:
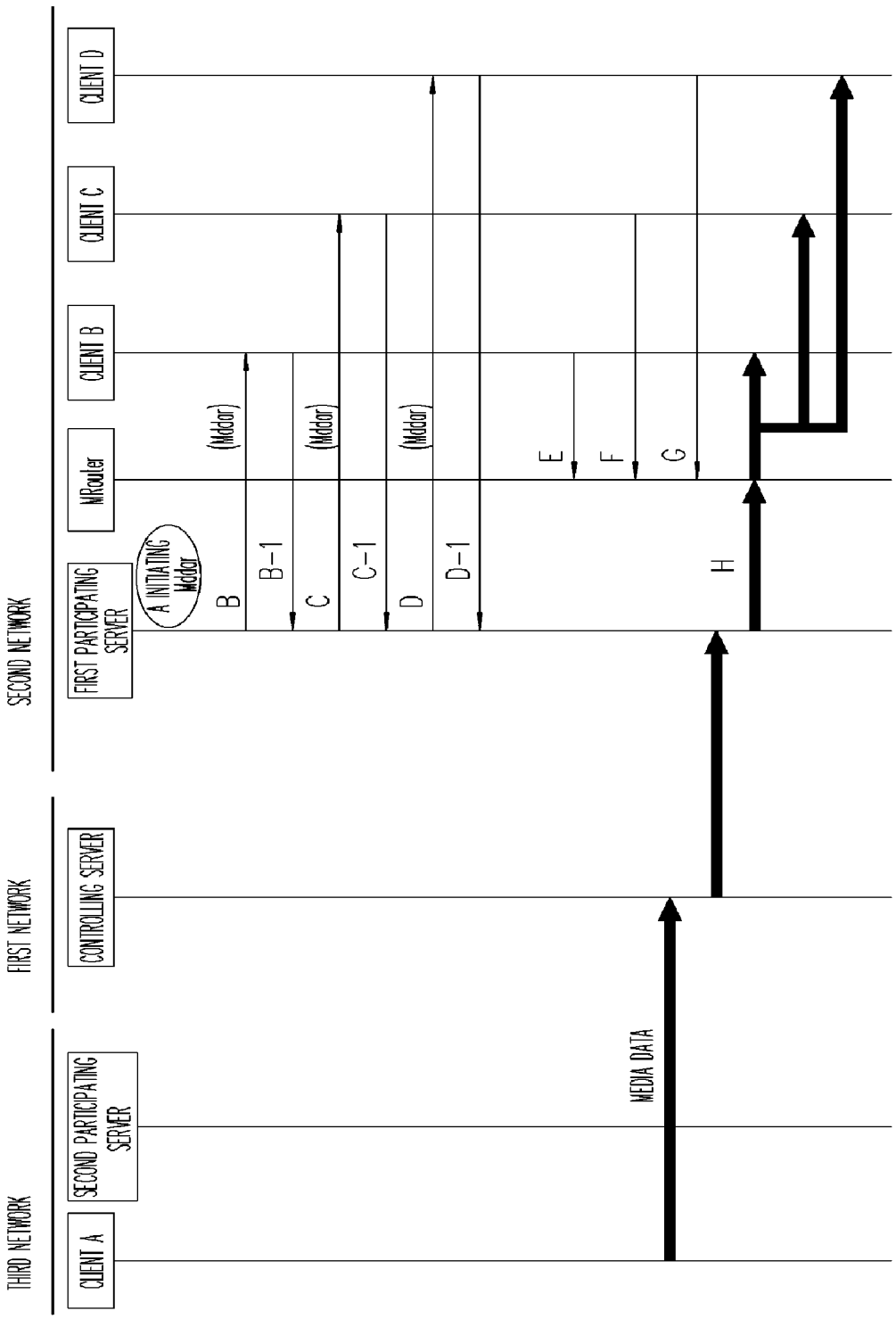

FIGS. 4A and 4B are schematic detailed flowcharts for distributing media data after establishing a PoC communication group according to the embodiment of the present invention. Referring to FIG. 4A and FIG. 2 first, the steps are described in sequence as follows.

At step A-1, the client A informs the second participating server of initiating a PoC communication service and the media receiving port A as one in charge of supporting in the client A.

At step A-2, the second participating server records the media receiving port in the client A is A, delivers the request of establishing a group sent by the client A to the controlling server and informs the controlling server of the media receiving port PA1 as one in charge of supporting in the second participating server.

At step B-1, the controlling server receives the request of establishing a group and sends the request message to a group member (the client B), wherein the media receiving port CX1 as the one in the controlling server is informed.

At step B-2, the first participating server receives the request message from the controlling server, records the media receiving port in the controlling server, delivers the group request from the controlling server to the client B and informs the media receiving port PB1 as the one in charge of supporting in the first participating server.

At step C-1, the controlling server receives the request of establishing a group, sends the request message to a group member (the client C), wherein the media receiving port CX1 as the one in the controlling server is informed.

At step C-2, the first participating server receives the request message from the controlling server, records the media receiving port in the controlling server, delivers the group request from the controlling server to the client C and informs the media receiving port PB2 as the one in charge of supporting in the first participating server.

At step D-1, the controlling server receives the request of establishing a group, sends the request message to a group member (the client C), wherein the media receiving port CX1 as the one in the controlling server is informed.

At step D-2, the first participating server receives the request message from the controlling server, records the media receiving port in the controlling server, delivers the group request from the controlling server to the client D and informs the media receiving port PB3 as the one in charge of supporting in the first participating server.

At steps E-1 and E-2, a response from the client B is arrived, wherein the media receiving port B in the client B is reported; and a response from the first participating server is arrived, wherein the media receiving port PB1 in the first participating server is reported.

At steps F-1 and F-2, a response from the client C is arrived, wherein the media receiving port C in the client C is reported; and a response from the first participating server is arrived, wherein the media receiving port PB2 in the first participating server is reported.

At steps G-1 and G-2, a response from the client D is arrived, wherein the media receiving port D in the client D is reported; and a response from the first participating server is arrived, wherein the media receiving port PB3 in the first participating server is reported.

At steps H-1 and H-2, the controlling server receives a first OK message in response to the request to assure establishing the group and feeds back the OK message to the client A, the initiator of the group, wherein the media receiving port in the controlling server is informed. At the time, the two points of delivering messages have exchanged the media receiving ports thereof to each other and the path of delivering the group voices has been completely established. Herein, the group control center (controlling server) has noticed that there are three members in total, who get the service from a same participating server.

At step I-1, the group control center (controlling server) sends a message to the first participating server to indicate that the clients B, C and A belong to a same group and ask the first participating server to build an additional, new media receiving port.

At step I-2, the first participating server informs the newly added media receiving port PB4 to the group control center (controlling server) as the response and agrees with that the voice data of the multiple members in the group is needed to be delivered to the port once only.

Continuing to FIG. 4B and referring to FIG. 2, the steps are described in sequence as follows.

At step A, the first participating server initiates a multicast address Maddr for downloading the group voices.

At step B, the first participating server uses the INFO message to inform the client B of the multicast address Maddr for downloading the group voices and ask the client B to participate in the multicast address Maddr initiated thereby.

At step B-1, the client B sends a OK response message corresponding to step B to the first participating server, wherein the client B agrees with participating in the multicast address and expresses to support the multicast address.

At step C, the first participating server uses the INFO message to inform the client C of the multicast address Maddr for downloading the group voices and ask the client C to participate in the multicast address Maddr initiated thereby.

At step C-1, the client C sends a OK response message corresponding to step C to the first participating server, wherein the client C agrees with participating in the multicast address and expresses to support the multicast address.

At step D, the first participating server uses the INFO message to inform the client D of the multicast address Maddr for downloading the group voices and ask the client D to participate in the multicast address Maddr initiated thereby.

At step D-1, the client D sends a OK response message corresponding to step D to the first participating server, wherein the client D agrees with participating in the multicast address and expresses to support the multicast address.

At step E, the client B sends an IGMP (Internet Group Management Protocol) report message to MRouter asking to join the multicast of Maddr.

At step F, the client C sends an IGMP report message to MRouter asking to join the multicast of Maddr.

At step G, the client D sends an IGMP report message to MRouter asking to join the multicast of Maddr.

At step H, after the work flow is completed according to the previously-given multicast address, the first participating server has known which members in the group are supporting the multicast address; the first participating server delivers the received voice data to be downloaded to the multicast address Maddr and MRouter would distribute the voice data packet to all the clients participating in the multicast address Maddr.

The present invention has the advantage of being compatible with the pertinent standards set by OMA. If a client does not support the multicast, the conventional scheme is still available for the first participating server to deliver a media data to the client who does not support the multicast.

In summary, according to the present invention, a new media receiving port is established in the first participating server which manages multiple clients. Therefore, when a media data is to be delivered to the clients managed by the first participating server, the controlling server delivers the media data merely to the new media receiving port, which changes the path for delivering the media data. Accordingly, the problem that the media data packet is repeatedly sent can be avoided. As a result, the waste of the Internet resource and bandwidth can be eliminated. In addition, the multicast technology is employed in the first participating server, which further advances the efficiency of media data delivery during a communication.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A method for distributing media data in PoC (push-to-talk over cellular) applied to a PoC system, the PoC system comprises a plurality of clients, a controlling server and a first participating server, wherein the first participating server comprises a plurality of media receiving ports and the media data received by the media receiving ports is delivered to the clients managed by the first participating server; the method comprising the following steps:

sending a request to establish a communication group from the controlling server;

receiving responses of agreeing with the request at the controlling server;

sending a message from the controlling server to the first participating server in order to establish a new media receiving port comprising multicasting in the first participating server if at least two clients among all the clients joining the communication group belong to the first participating server and accept the management thereby; and delivering the media data from the controlling server to the new media receiving port in the first participating server when the first participating server is to deliver the media data to the at least two clients among all the clients joining the communication group managed by the first participating server after the controlling server has received the response of having established the new media receiving port comprising multicasting so that the media data received by the new media receiving port comprising multicasting is delivered to the at least two clients among all the clients joining the communication group managed by the first participating server.

2. The method for distributing media data in PoC as recited in claim 1, further comprising the following steps:

establishing a multicast address in the first participating server;

informing the clients managed by the first participating server of the multicast address from the first participating server; and delivering the media data from the first participating server to the multicast address when the first participating server is to deliver the media data to the clients after the first participating server has received the response of participating the multicast address sent by the clients.

3. The method for distributing media data in PoC as recited in claim 1, wherein the PoC system further comprises a second participating server and the method further comprises the following steps:

receiving a request to establish the communication group sent by a requesting client managed by the second participating server at the second participating server;

sending a request of establishing the communication group to the controlling server from the second participating server;

receiving a response of agreeing with the request from the controlling server at the second participating server; and sending a response of agreeing with the request to the requesting client from the second participating server.

4. The method for distributing media data in PoC as recited in claim 3, further comprising the following steps:

receiving the media data sent by the requesting client at the second participating server; and sending the media data to the controlling server from the second participating server.

5. The method for distributing media data in PoC as recited in claim 1, wherein the media data is a voice data.

6. A PoC system (push-to-talk over cellular system), comprising:

a plurality of clients;

a controlling server for sending a request of establishing a communication group and then receiving a response of agreeing with the request; and a first participating server comprising a plurality of media receiving ports, wherein media data received by the media receiving ports is delivered to the clients managed by the first participating server, informing the first participating server from the controlling server to the first participating server in order to establish a new media receiving port comprising multicasting in the first participating server if at least two clients among all the clients joining the communication group belong to the first participating server and accept the management thereby, and delivering the media data from the controlling server to the new media receiving port comprising multicasting in the first participating server when the first participating server is to deliver the media data to the at least two clients among all the clients joining the communication group managed by the first participating server after the controlling server has received the response of having established the new media receiving port comprising multicasting already so that the media data received by the new media receiving port comprising multicasting is delivered to the at least two clients among all the clients joining the communication group managed by the first participating server.

7. The PoC system as recited in claim 6, wherein the first participating server establishes a multicast address and informs the clients managed thereby of the multicast address; when the first participating server is to deliver the media data to the clients after the responses of participating the multicast address sent by the clients are received, the first participating server delivers the media data to the multicast address.

8. The PoC system as recited in claim 6, further comprising a second participating server, wherein the second participating server receives a request of establishing the communication group sent by a requesting client managed thereby, the second participating server sends a request of establishing the communication group to the controlling server and after the second participating server receives a response of agreeing with the request from the controlling server, the second participating server sends a response of agreeing with the request to the requesting client.

9. The PoC system as recited in claim 8, wherein the second participating server receives the media data sent by the requesting client and then sends the media data to the controlling server.

10. The PoC system as recited in claim 6, wherein the media data is a voice data.

* * * * *